United States Patent
Eliskovich

(10) Patent No.: US 11,559,169 B1
(45) Date of Patent: Jan. 24, 2023

(54) SINGLE SHELL TACO FRY MOLD

(71) Applicant: Christopher Eliskovich, Vallejo, CA (US)

(72) Inventor: Christopher Eliskovich, Vallejo, CA (US)

(*) Notice: Subject to any disclaimer, the term of this patent is extended or adjusted under 35 U.S.C. 154(b) by 318 days.

(21) Appl. No.: 16/819,525

(22) Filed: Mar. 16, 2020

(51) Int. Cl.
*A47J 37/12* (2006.01)
*A21D 13/42* (2017.01)

(52) U.S. Cl.
CPC ........... *A47J 37/1295* (2013.01); *A21D 13/42* (2017.01)

(58) Field of Classification Search
CPC .............................. A47J 37/1295; A21D 13/42
See application file for complete search history.

(56) References Cited

U.S. PATENT DOCUMENTS

| | | | | |
|---|---|---|---|---|
| 2,635,528 A | * | 4/1953 | Torres ................. | A47J 37/1295 99/413 |
| 2,778,294 A | * | 1/1957 | Ulloa ..................... | A47J 43/18 414/586 |
| 3,537,389 A | * | 11/1970 | Villarreal ............ | A47J 37/1295 99/427 |
| 3,745,911 A | * | 7/1973 | Kennedy, Jr. .......... | A47J 43/18 99/426 |
| 3,817,163 A | * | 6/1974 | Kizziar .................. | A47J 43/18 99/426 |
| 4,517,887 A | | 5/1985 | Childress | |
| 4,530,275 A | | 7/1985 | Stickle et al. | |
| 5,743,174 A | | 4/1998 | Stickle | |
| 5,937,743 A | | 8/1999 | Overstreet | |
| D607,287 S | * | 1/2010 | Beasley ......................... | D7/674 |
| 9,131,805 B1 | | 9/2015 | Wilkes | |
| 2007/0000391 A1 | * | 1/2007 | Hill ......................... | A47J 43/18 99/349 |
| 2008/0014324 A1 | | 1/2008 | Darnell | |
| 2021/0022350 A1 | * | 1/2021 | Osborn ................ | A21C 15/025 |

OTHER PUBLICATIONS

Osborn, Joshua Thomas; Taco Shell Mold; U.S. Appl. No. 62/890,444, filed Aug. 22, 2019 (Year: 2019).*
Osborn, Joshua Thomas; Taco Shell Mold; U.S. Appl. No. 62/876,833, filed Jul. 22, 2019 (Year: 2019).*

* cited by examiner

*Primary Examiner* — John J Norton
(74) *Attorney, Agent, or Firm* — Cramer Patent & Design, PLLC; Aaron R. Cramer

(57) ABSTRACT

A single shell taco fry mold device to enable a user to deep fry a single taco shell. The single shell taco fry mold device includes an open end, a connected end, an outside layer, an inside layer, and a handle. A handle rest of the handle includes a twist or angled bend, thereby allowing the user to rest the handle on an edge of a pan or deep fryer within which it is placed. The outside layer includes at least one support rung to adjoin the outside layer to the inside layer to act as a stopping barrier on the connected end that prevents the tortilla from sliding through or out of the single shell taco fry mold device. The handle grip is made from rubberized plastics to retain the single shell taco fry mold device in a secure and comfortable manner.

9 Claims, 6 Drawing Sheets

SINGLE SHELL TACO FRY MOLD

RELATED APPLICATIONS

None.

FIELD OF THE INVENTION

The presently disclosed subject matter is directed to a fry mold and more specifically to a taco fry mold.

BACKGROUND OF THE INVENTION

Tacos are a traditional Mexican dish composed of a corn, flour, or wheat tortilla folded or rolled around various fillings such as meat and vegetables. Numerous styles of tacos have become quite popular; however, the style that has become most common is the hard-shell, "U"-shaped version. These types of tacos are often prepared using a crispy shell formed by deep frying a soft, thin flatbread or tortilla and are sold by restaurants or food trucks and are mass produced and sold for commercial and/or home taco preparation.

If an individual wishes to make a fresh taco shell then unfortunately, the frying process can be a tedious and difficult task requiring the tortilla to be manually held in the desired shape during frying or by the use of various baskets or pans which hold the tortilla. This process often generates taco shells which are deformed or having a shape ill-suited for use. Additionally, when an individual wishes to make a single fresh taco shell at home—the options are often limited given the aforementioned problems thereby either requiring the individual to make more than one shell or skip the endeavor entirely.

There have been several efforts to enable an individual to deep fry a single taco shell however such efforts often result in the shell breaking or over-expanding within the form. The development of the single shell taco fry mold addresses these problems in a manner that is efficient and effective.

SUMMARY OF THE INVENTION

The principles of the present invention provide for a fry mold device which comprises a connected end and an open end having an outside layer and an inside layer. The open end allowing for a food to be slid horizontally between the outside layer and the inside layer. The fry mold device also comprises an outside layer having at least one support rung adjoining the outside layer to the inside layer, an inside layer having a plurality of vent holes which permit a cooking medium to pass through the fry mold device to help thoroughly cook the enclosed food; and a handle disposed on a top portion of fry mold device. The handle having a handle grip and a handle rest.

The food may comprise a tortilla further comprising a corn or flour tortilla. The food may also comprise a taco shell or a disc-shaped food item which is folded like the taco. The food may be prepared in a quick and easy manner that may help to protect from one or more hot cooking oils or hot cooking surfaces. At least one support rung may act as a stopping barrier on the connected end that prevents the food from sliding through or out of the fry mold device.

The enclosed food may be frictionally retained within the fry mold device. The vent holes of the inside layer may be seen through the horizontal spaces formed by the support rungs of the outside layer. The inside layer may be surrounded by a wire grate of the outside layer. The handle rest may be disposed on the handle just above a food support area created between the outside layer and the inside layer. The food may be cooked in a heating medium within the support area. The handle grip may be made of rubberized plastic to retain the fry mold device in a secure and comfortable manner.

The handle rest may be a twisted handle rest to provide enough of a gripping surface on the side, while remaining in-line and narrow with the fry mold device. The handle rest may be an angled handle rest to provide enough of a gripping surface on the side, while remaining in-line and narrow with the fry mold device. The handle may extend far enough away from the outside layer so that it measures twelve inches from top to bottom.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
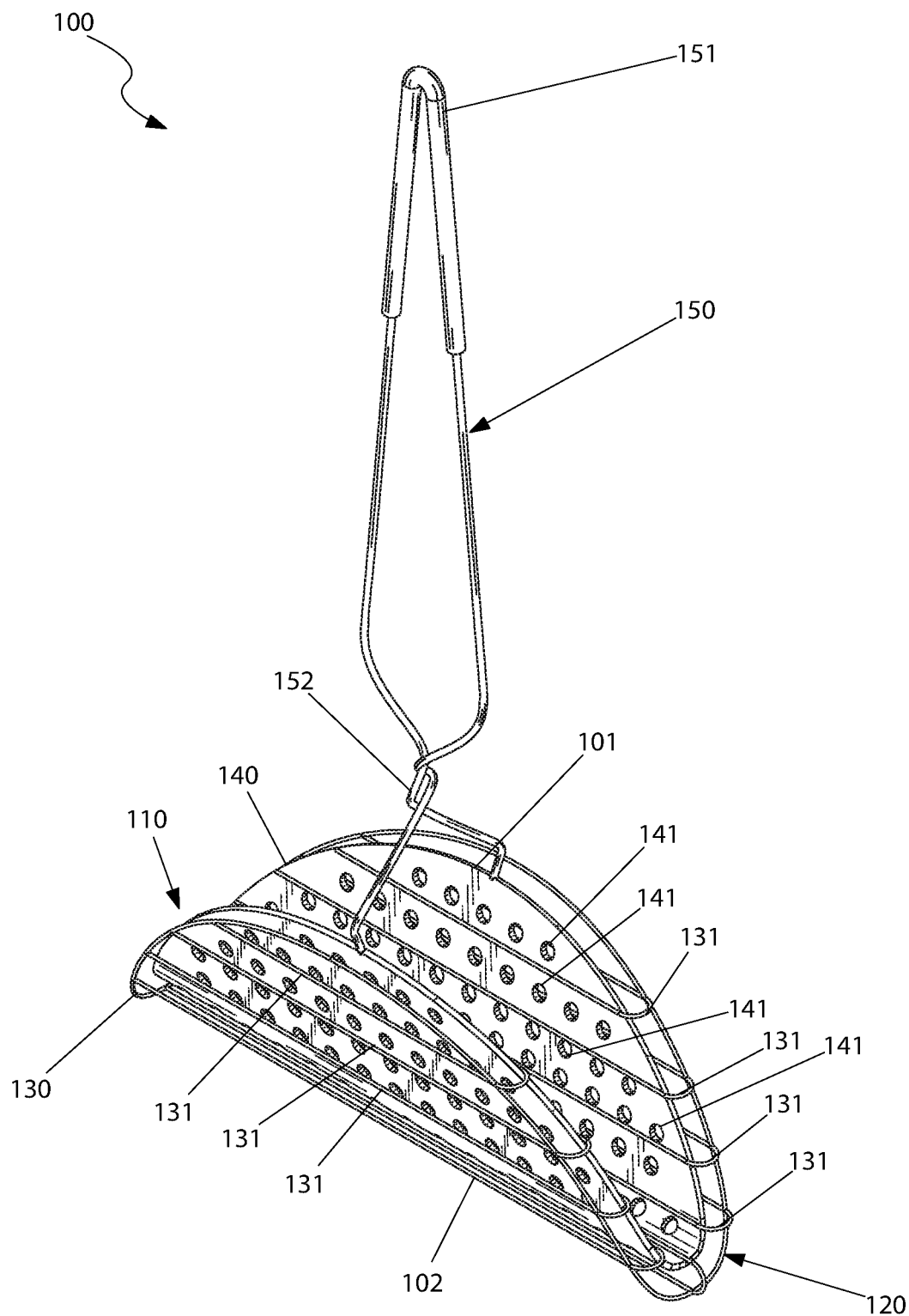
FIG. 1 is a top perspective view of the single taco fry mold device 100, according to the preferred embodiment of the present invention.

DESCRIPTIVE KEY 100 single taco fry mold device
101 top
102 bottom
110 open end
120 connected end
130 outside layer
131 support rung
140 inside layer
141 vent hole
150 handle
151 handle grip
152 handle rest

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a top perspective view of the single taco fry mold device 100 including an open end 110, a connected end 120, an outside layer 130, an inside layer 140 and handle 150. The device 100 may be useful for cooking individual tortillas in a frying pan (not shown) or deep fryer device (not shown). The handle 150 may be configured at a top 101 portion of the device 100. The handle 150 may include a handle grip 151 and a handle rest 152. The handle grip 151 may be configured from rubberized plastics or other suitable materials that allow for a user to retain the device 100 in a secure and comfortable manner. The handle rest 152 of the handle 150 may be configured as a twist or angled bend in the device, thereby allowing the user to rest the handle 150 of the device on an edge of a pan or deep fryer within which it is placed. The open end 110 allows for said tortilla to be slid horizontally into the device 100 between the outside layer 130 and the inside layer 140. The outside layer 130 may include at least one (1) support rung 131 configured to adjoin the outside layer 130 to the inside layer 140. The at least one support rung 131 (which may be featured as a series of horizontal rungs) may also act as a stopping barrier on the connected end 120 that prevents the tortilla from sliding through or out of the device 100.

Figure 2:
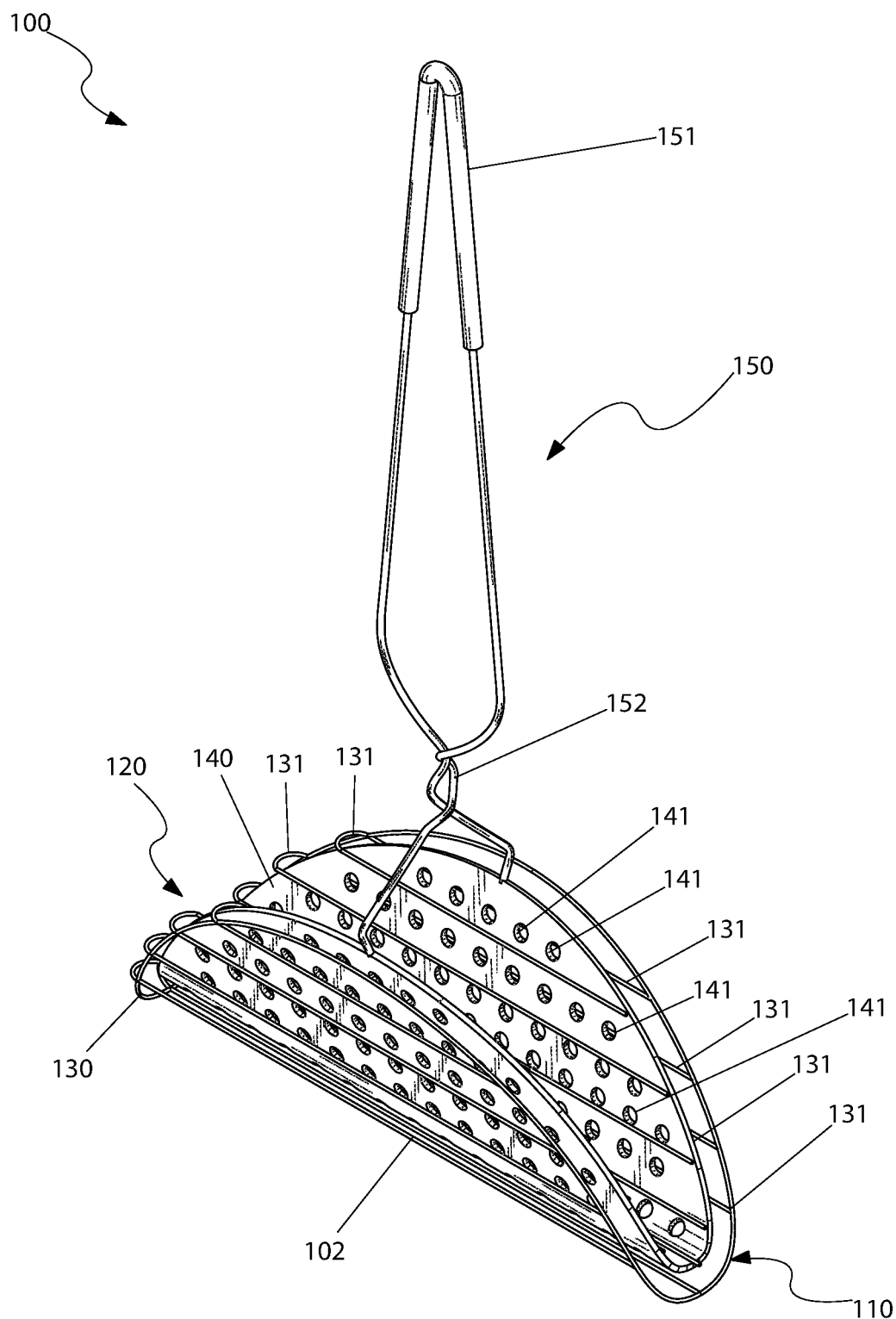
FIG. 2 is an additional top perspective view of the single taco fry mold device 100, according to the preferred embodiment of the present invention.

Referring next to FIG. 2, an additional top perspective view of the single taco fry mold device 100, according to the preferred embodiment of the present invention is depicted. Here again, the handle 150 can be seen at the top 101 and includes a handle grip 151 and handle rest 152. The open end 110 is configured to allow for a tortilla to be slid horizontally into the device 100 between the outside layer 130 and the inside layer 140. The outside layer 130 may include at least one (1) support rung 131 configured to adjoin the outside layer 130 to the inside layer 140. The inside layer 140 may include a plurality of vent holes 141 that permit oils and/or any other cooking medium to pass through the device 100 to help thoroughly cook the enclosed tortilla.

Figure 3:
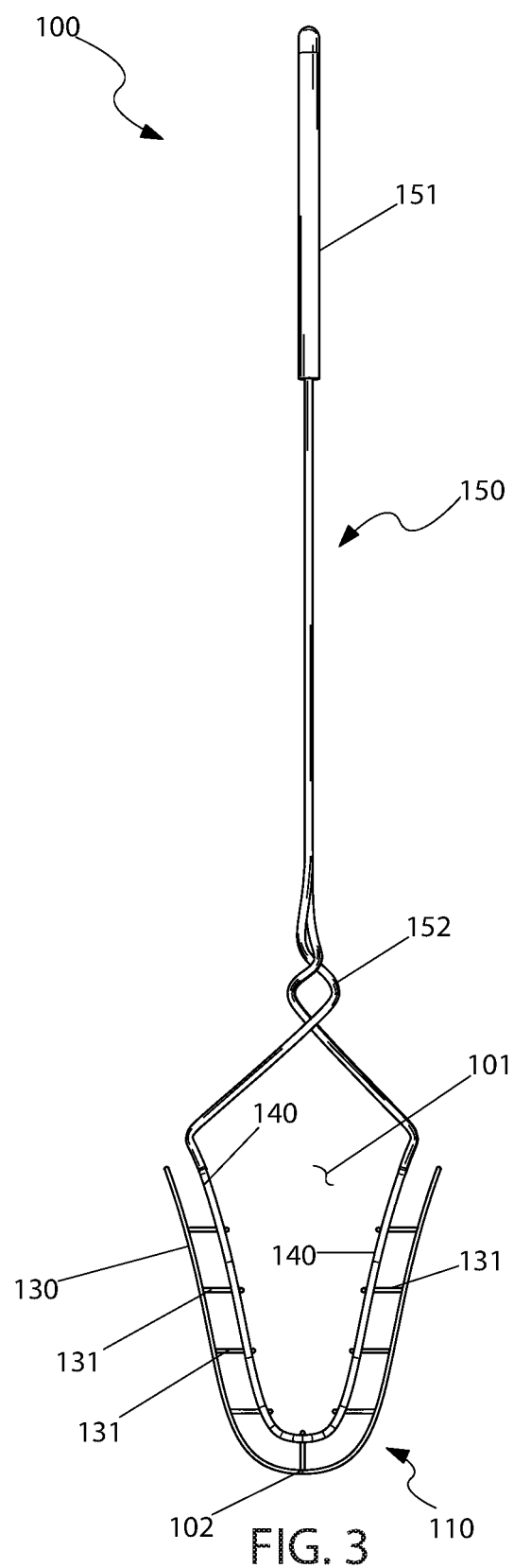
FIG. 3 is a side view of the device showing the open end 110, according to the preferred embodiment of the present invention.
Figure 4:
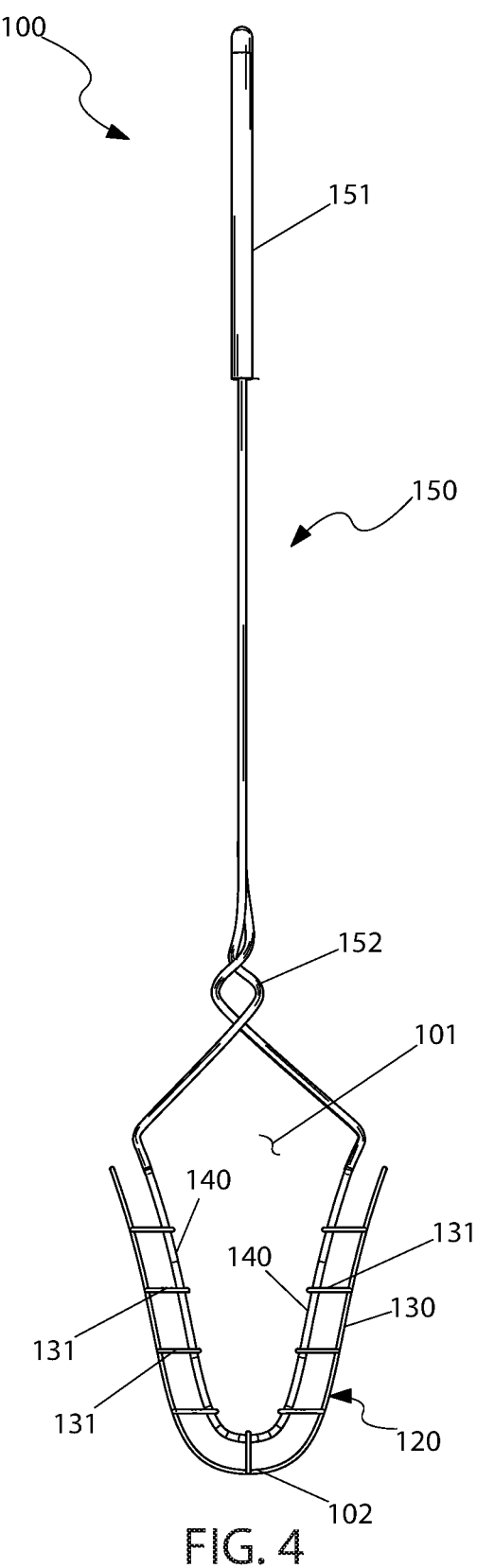
FIG. 4 is a side view of the device showing the connected end 120, according to the preferred embodiment of the present invention.

Referring now to FIG. 3 and FIG. 4, there is shown a contrasting pair of side views of the device 100 illustrating the open end 110 and connected end 120 respectively, according to preferred embodiments of the present invention. These figures both disclose the open space that exists between the outside layer 130 and inside layer 140 for frictionally retaining a tortilla. Here again, the handle rest 152 can be clearly seen configured on the handle 150 just above the tortilla support area created between the outside layer 130 and inside layer 140. The handle rest 152 may be propped against the rim or edge of a fry pan, deep fryer or other lipped cooking apparatus so that the user does not have to hold on to the handle 150 and/or handle grip 151 throughout the entire cooking process.

Figure 5:
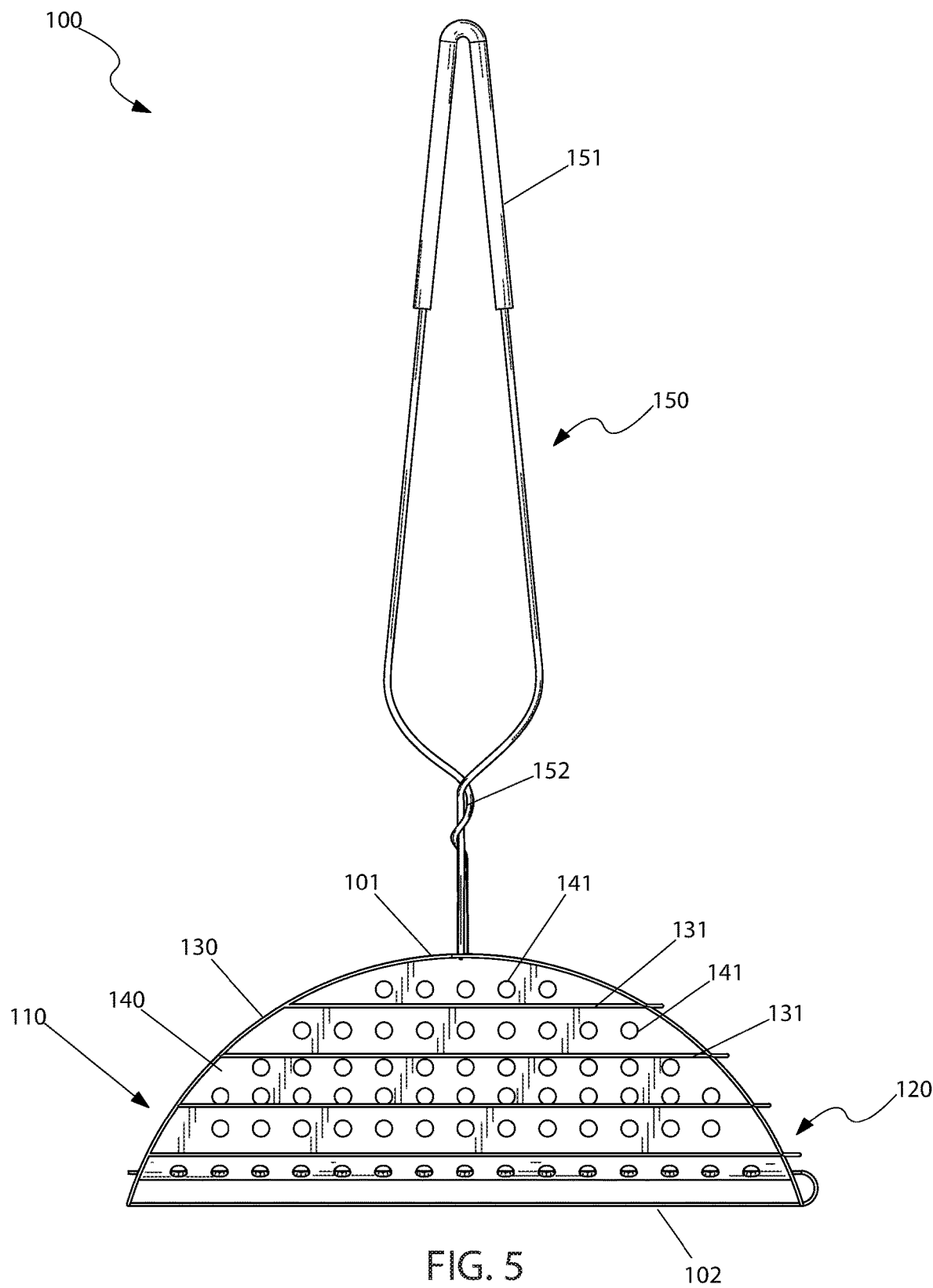
FIG. 5 is a front view of the single taco fry mold device 100, according to the preferred embodiment of the present invention.
Figure 6:
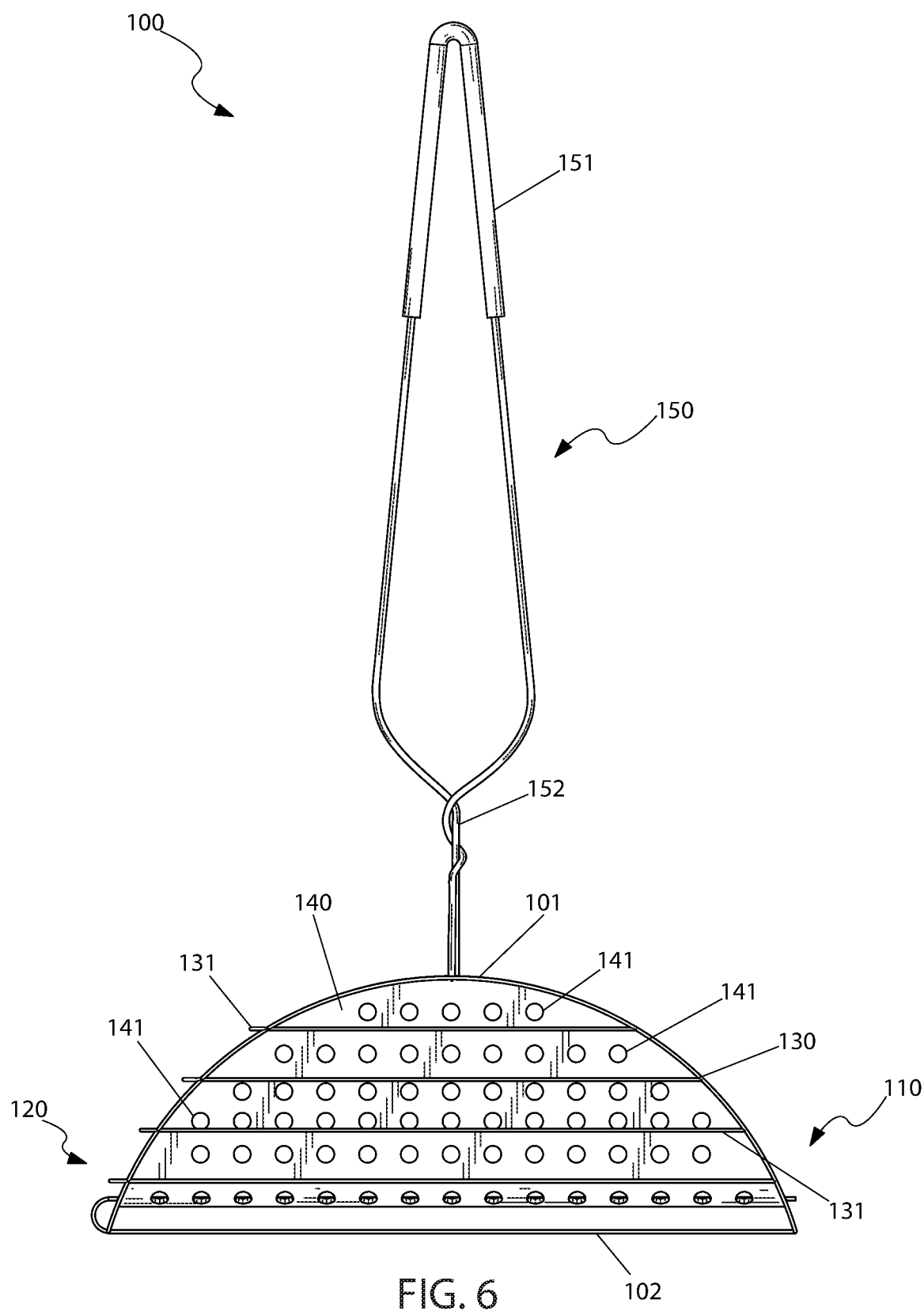
FIG. 6 is a back view of the single taco fry mold device 100, according to the preferred embodiment of the present invention.

Referring next to FIG. 5 and FIG. 6, there is shown a front view and back view of the single taco fry mold device, according to preferred embodiments of the present invention. These figures both disclose the outside layer 130 and inside layer 140 used to releasably support a tortilla while being deep fried. The vent holes 141 of the inside layer can be seen through the horizontal spaces formed by the support rungs 131 of the outside layer 130. The handle 150 may extend far enough away from the outside layer 130 so that it measures approximately 12 inches from top 101 to bottom 102. The handle 150 itself may be formed from an angled bend in the wire structure to provide enough of a gripping surface for a user from the side, while remaining in-line and narrow as shown in the previous side views of FIG. 3 and FIG. 4.

Figure 7:
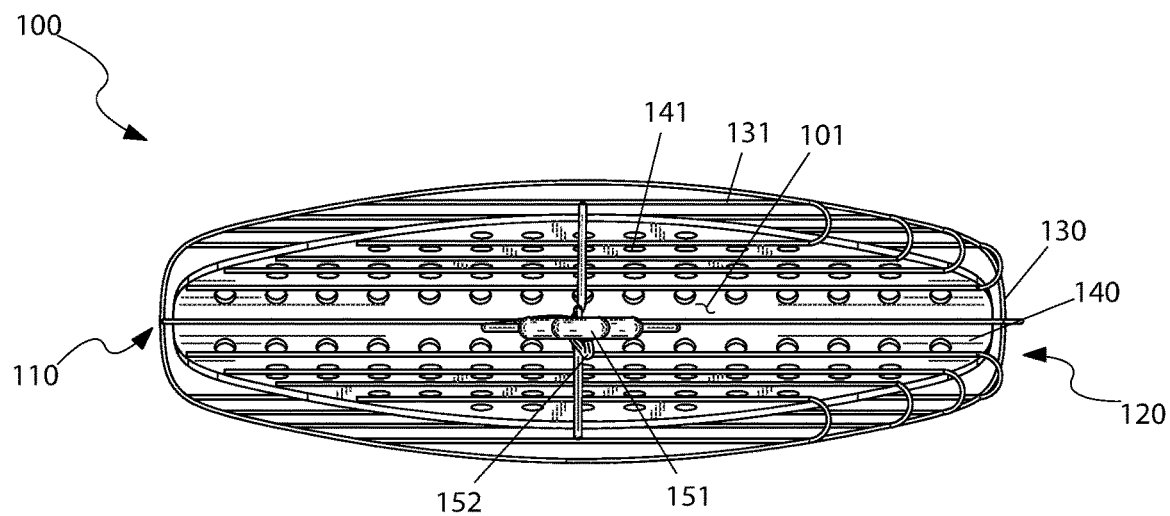
FIG. 7 is a top view of the single taco fry mold device 100, according to the preferred embodiment of the present invention.
Figure 8:
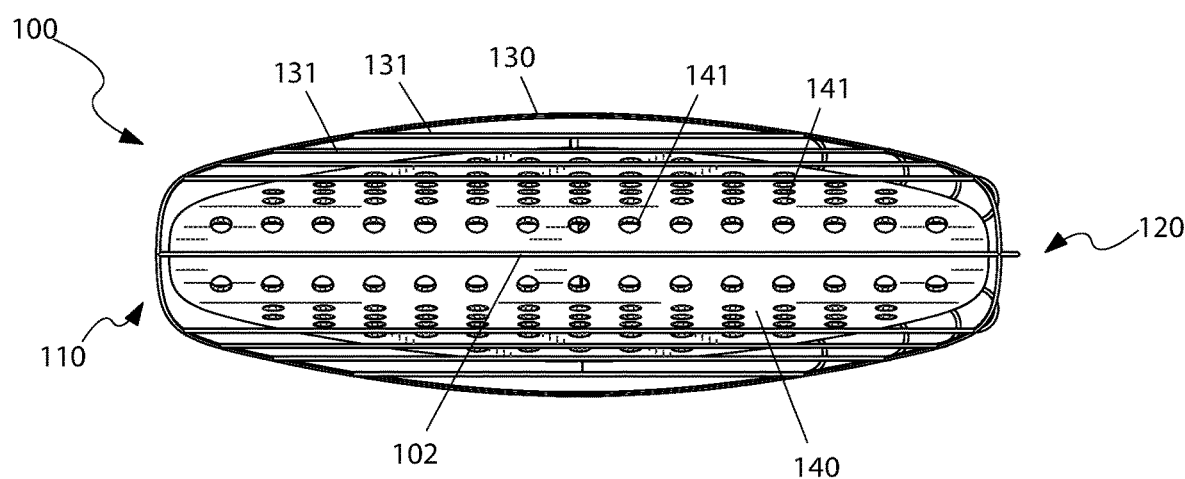
FIG. 8 is a bottom view of the single taco fry mold device 100, according to the preferred embodiment of the present invention.

Referring lastly to FIG. 7 and FIG. 8, there is shown a top and bottom view of the single taco fry mold device 100, according to preferred embodiments of the present invention. FIG. 7 (top view) clearly illustrates the open space around the perimeter that exists between the outside layer 130 and inside layer 140 for frictionally retaining a tortilla. FIG. 8 (bottom view) features the inside layer 140 surrounded by the wire grate of the outside layer 130. The present configuration may allow for a corn tortilla, flour tortilla, or other disc-shaped food item to be folded like a taco and cooked in a heating medium within the support area of the device 100. The present invention may be especially suited for the preparation of a single taco shell in a quick and easy manner that helps to protect a user's hand or hands from hot cooking oils or cooking surfaces.

2. OPERATION OF THE PREFERRED EMBODIMENT

The preferred embodiment of the present invention can be utilized by the common user in a simple and effortless manner with little or no training. It is prescribed that the device 100 would be constructed in general accordance with FIG. 1 through FIG. 8. The user would acquire the device 100 and related cooking ingredients (tortillas, cooking medium, cooking utensils, etc) through normal procurement channels.

After the user has all necessary ingredients, the device 100 would be prepared by placing a single tortilla in a concave formation within the outside layer 130 and inside layer 140 of the device by inserting it horizontally. The user may then hold the handle grip 151 of the handle 150 tightly and slowly lower the entire device 100 containing the tortilla into the cooking utensil (preferably a fry pan or deep fryer). After an appropriate amount of time has passed to cook the enclosed tortilla to the user's desired level of readiness, the user may simply pull the device 100 out of the cooking apparatus and place the cooked item on a plate or serving platter. While the tortilla is being cooked, the user my additionally choose to rest the device 100 at an angle about the rim of the cooking apparatus. This may be easily done by resting the handle rest 152 portion of the handle 150 against an edge of the cooking apparatus or utensil. The present invention is simple, easy to use and comprises no moving parts or special skills. The device may be constructed from a plurality of materials including various metals (stainless steel or other appropriate metals) and rubberized plastic coating for the handle 150.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A fry mold device, comprising:
    a connected end;
    an open end having an outside layer and an inside layer, the open end allowing for a food to be slid horizontally between the outside layer and the inside layer; and
    a handle disposed on a top portion of the inside layer, the handle having a handle grip and a handle rest;
    wherein the outside layer has a plurality of support rungs adjoining the outside layer to the inside layer;
    wherein the inside layer has a plurality of vent holes that permit a cooking medium to pass through the fry mold device to help thoroughly cook the enclosed food;
    wherein the support rungs act as a stopping barrier on the connected end that prevents the food from sliding through or out of the fry mold device;
    wherein the inside layer is surrounded by a wire grate of the outside layer;
    wherein the handle rest is disposed on the handle just above a food support area created between the outside layer and the inside layer;
    wherein the handle grip is made of rubberized plastic to retain the fry mold device in a secure and comfortable manner;
    wherein the handle rest is a twisted angled handle rest to provide enough of a gripping surface on the side, while remaining in-line and narrow with the fry mold device;
    wherein the enclosed food is frictionally retained within the fry mold device; and
    wherein the vent holes of the inside layer are seen through a plurality of horizontal spaces formed by the support rungs of the outside layer.

2. The fry mold device according to claim 1, wherein the food is a tortilla.

3. The fry mold device according to claim 2, wherein the food is a corn tortilla.

4. The fry mold device according to claim 2, wherein the food is a flour tortilla.

5. The fry mold device according to claim 1, wherein the food is a taco shell.

6. The fry mold device according to claim 1, wherein the food is prepared in a quick and easy manner that helps to protect from one or more hot cooking oils.

7. The fry mold device according to claim 1, wherein the food is prepared in a quick and easy manner that helps to protect from one or more hot cooking surfaces.

8. The fry mold device according to claim 1, wherein the food is cooked in a heating medium within the support area.

9. The fry mold device according to claim 1, wherein the handle extends far enough away from the outside layer so that it measures 12 inches from top to bottom.

\* \* \* \* \*